Nov. 4, 1958 B. C. SIDLINGER 2,858,551
TRAMPOLINE
Filed Nov. 9, 1953
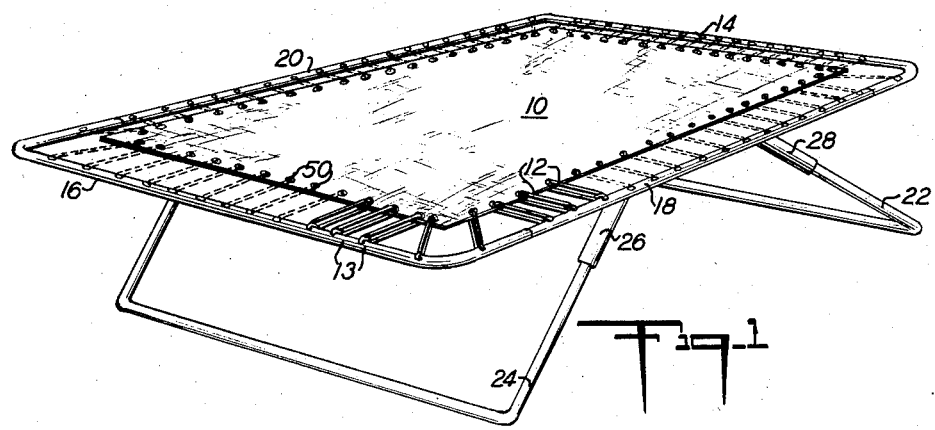
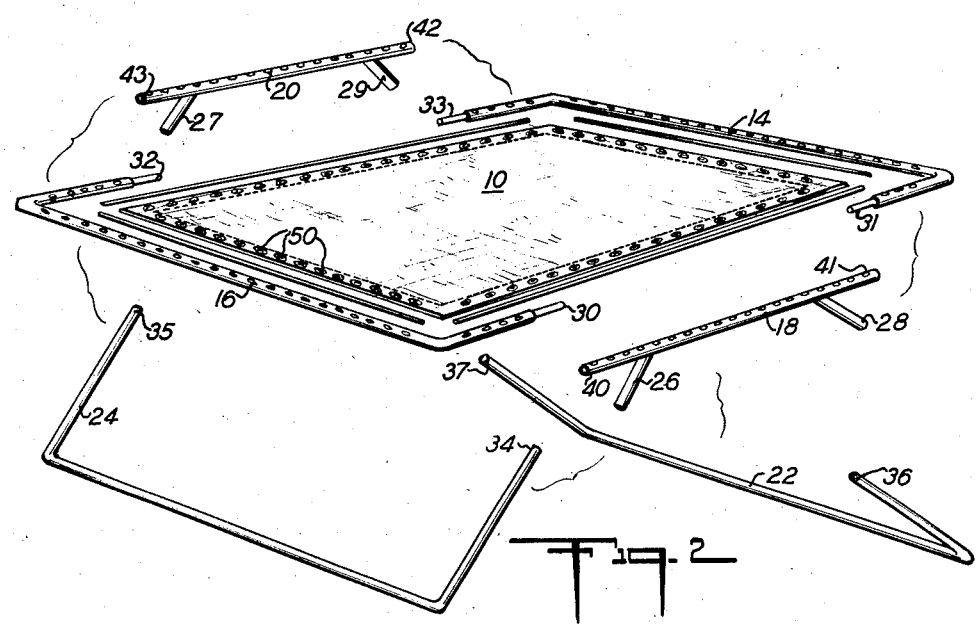
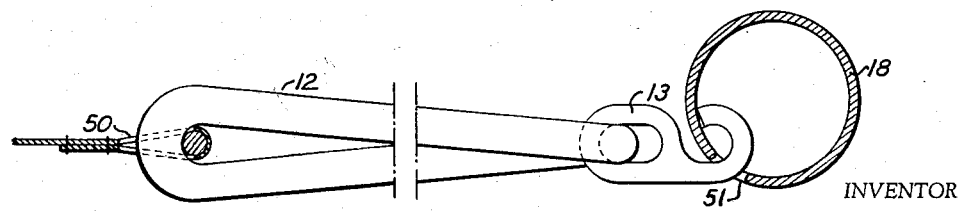
INVENTOR
BRUCE C. SIDLINGER
BY Fisher & Christen
ATTORNEY

United States Patent Office 2,858,551
Patented Nov. 4, 1958

2,858,551

TRAMPOLINE

Bruce C. Sidlinger, Cedar Rapids, Iowa

Application November 9, 1953, Serial No. 391,063

1 Claim. (Cl. 5—110)

This invention relates to a trampoline constructed for ease of assembly and disassembly. The structure of the present invention is particularly adaptable for use by children who are just beginning to learn the art of trampoline tumbling. The preferred construction is sturdy and combines the advantages of sound construction with the advantages of simple assembly and disassembly.

In its broadest aspect, the trampoline of this invention comprises a pair of tubular end members, a pair of U-shaped tubular leg members, a pair of tubular side members, telescopic joints for joining the end members with the side members and for joining the leg members with the side members, and a flat bed adapted to be resiliently suspended within the frame defined by the end and side members by a plurality of resilient connectors, the connectors and the bed acting to hold the end members and side members in joined relationship and the force of gravity acting to hold the side members and the leg members in joined relationship.

In the preferred construction, the end members are U-shaped and the side members are straight except for depending portions, each of which forms one part of a telescopic joint for attaching the legs. It is, of course, immaterial which one of the members carries the male portion and which one carries the female portion of the telescoping joint. In one form of the invention, the flat bed is connected to the side and end members by tension members hooked into holes bored along the top of the side and end members. In another form of the invention, resilient connectors are simply hooked over the end and side members.

The invention will be better understood by reference to the accompanying drawings in which:

Fig. 1 is a perspective view of an assembled trampoline constructed in accordance with the present invention;

Fig. 2 is an exploded view of the trampoline of Fig. 1 with each of the telescopic joints pulled apart.

Fig. 3 is an inverted view illustrating one means of connecting the trampoline bed to the frame.

Referring now to that preferred form of the trampoline shown in the drawings, a trampoline bed 10 is mounted in a frame construction (to be described in detail hereinafter) by means of a plurality of resilient connectors 12 which carry hooks 13. Each resilient connector as illustrated is made from a single length of a cord formed from a plurality of resilient rubber bands formed as a core in a flexible braided cover. Each length of cord is formed into a circle as illustrated in Fig. 3 and the ends are overlapped and joined by banding the overlapped portions with thread in a manner not illustrated herein but well known in the prior art. These connectors are characterized by a high degree of resiliency and are particularly adapted to use in devices for propelling the human body.

The framework comprises a pair of U-shaped end members 14 and 16, a pair of straight side members 18 and 20 and a pair of U-shaped leg members 22 and 24. Each side member is provided with a pair of angled depending telescopic sockets 26 and 28 on member 18 and 27 and 29 on member 20. In the preferred construction, each end member is provided with the male plugs of a telescopic joint to be formed with the side members, namely, plugs 30 and 32 on end member 16 and plugs 31 and 33 on end member 14. The leg members 22 and 24 are small enough to form male plugs of telescopic joints and they fit into the depending sockets of the side members. These are plugs 34 and 35 of leg member 24 and plugs 36 and 37 on leg member 22. In addition to the depending sockets, the tubular construction of each side member forms a socket at each end thereof, namely, sockets 40, 41, 42 and 43 for receiving the male plugs of the end members. The tops of the side and end members carry a plurality of spaced holes 50 for mounting the connector hooks.

In assembly, the two U-shaped leg members 22 and 24 are placed in an upright position and the two side members are fixed thereon by sliding the side member carried telescopic sockets 26, 27, 28 and 29 onto leg plugs 34, 35, 36 and 37, respectively. Next, the end members are telescoped into position by sliding plugs 30 and 32 into sockets 40 and 43 and then sliding plugs 31 and 33 into sockets 41 and 42. The bed is then placed in position. It is first fastened along one side member by means of hooks 13 and holes 51, then fastened along the other side member and then the connector hooks are affixed in the holes of the end members. The trampoline is then ready for use.

To disassemble, the connectors are removed from the frame in any desired sequence. The end members are removed first, then the side members are lifted off the legs and the device is ready for easy transportation.

It should be noted that the U-shape of the legs imparts considerable structural strength to the trampoline. Still another advantage of this preferred form of the invention is that it reduces the length of the side members considerably and thereby lessens the problems of transporting the device.

The telescoping joints should be made as close fitting and with as little clearance as possible so that there will be no tendency of the trampoline to chatter and to bounce one frame member with respect to another. In one form of the invention the possibility of chattering is removed by provision of hand operated set screws for positively holding the frame members in their proper positions.

The sockets that depend from the side members are carefully positioned in two respects. They are fixed on the side members closely adjacent the ¼ and ¾ length positions from one end thereof so that there will be an even support distribution without sag and they diverge enough to prevent any danger of tipping. As a result of the spacing of the sockets on the side members, these same sockets are spaced inwardly from each end of the frame a distance approximately equal to one-third of the length of the frame.

I claim:

A knock-down trampoline comprising a pair of straight side members, a pair of U-shaped end members removably telescopically joined with said side members to define a rectangular frame, each of said side members being provided with two, fixedly-mounted, symmetrical, spaced, downwardly extending and longitudinally diverging joint members, and as the sole support for said frame a pair of U-shaped legs each removably telescopically joined with two joint members at one end of said frame for supporting said rectangular frame, the diverging angle of said joint members and the length of said legs being proportioned to position the bottom of the U of said legs longitudinally near the ends of said frame to prevent tipping, and said joint members being spaced inwardly from each end of the frame a distance approximately equal to one-third of the length of the frame to avoid sag, and a trampoline bed removably mounted within said frame by a plurality of disconnectable spaced resilient connectors each under tension, the total tension being sufficient to support an acrobat on said bed and to hold said frame in assembled position during the performance of acrobatics on the assembled trampoline, whereby upon disconnecting said connectors, said frame may be knocked down for easy transportability.

References Cited in the file of this patent

UNITED STATES PATENTS

| | | |
|---|---|---|
| 1,060,295 | Stiles | Apr. 29, 1913 |
| 1,567,493 | Douglas | Dec. 29, 1925 |
| 1,586,355 | DeFranco | May 25, 1926 |
| 1,850,636 | Schauer | Mar. 22, 1932 |
| 2,370,990 | Nissen | Mar. 6, 1946 |
| 2,534,019 | Griswold | Dec. 12, 1950 |
| 2,575,537 | Trumfio | Nov. 20, 1951 |
| 2,670,478 | Gilfillan | Mar. 2, 1954 |

FOREIGN PATENTS

| | | |
|---|---|---|
| 137,284 | Austria | Apr. 25, 1934 |
| 263,612 | Switzerland | Dec. 1, 1949 |
| 638,792 | Great Britain | June 14, 1950 |